United States Patent [19]
Jansche et al.

[11] Patent Number: 5,146,783
[45] Date of Patent: Sep. 15, 1992

[54] LIQUID CONTAINER HYDROSTATIC LEVEL GAUGE

[75] Inventors: Walter Jansche, Durmersheim; Erich Zabler, Stutensee; Anton Dukart, Maximiliansau, all of Fed. Rep. of Germany

[73] Assignee: Robert Bosch GmbH, Stuttgart, Fed. Rep. of Germany

[21] Appl. No.: 634,226

[22] PCT Filed: Apr. 5, 1991

[86] PCT No.: PCT/DE90/00265
§ 371 Date: Jan. 2, 1991
§ 102(e) Date: Jan. 2, 1991

[87] PCT Pub. No.: WO90/13796
PCT Pub. Date: Nov. 15, 1990

[30] Foreign Application Priority Data

May 3, 1989 [DE] Fed. Rep. of Germany ....... 3914637

[51] Int. Cl.⁵ .............................................. G01F 23/18
[52] U.S. Cl. ........................................ 73/301; 73/302; 73/714
[58] Field of Search .................. 73/299, 301, 302, 714

[56] References Cited

U.S. PATENT DOCUMENTS

| | | | |
|---|---|---|---|
| 3,751,185 | 8/1973 | Gottiebson et al. | 73/299 X |
| 3,834,236 | 9/1974 | Durin | 73/302 |
| 4,020,690 | 5/1977 | Samuels et al. | 73/299 |
| 4,258,745 | 3/1981 | Nicholson | 73/302 X |
| 4,630,478 | 12/1986 | Johnson | 73/299 |
| 4,639,738 | 1/1987 | Young et al. | 73/302 X |
| 4,669,309 | 6/1987 | Cornelius | 73/299 |

*Primary Examiner*—Daniel M. Yasich
*Attorney, Agent, or Firm*—Edwin E. Greigg; Ronald E. Greigg

[57] ABSTRACT

A liquid container hydrostatic level gauge, in particular a fuel tank level indicator, which operates with a differential pressure sensor, a zero point calibration related to the height of the fuel is performed upon the beginning of measurement, in order to dispense with a requirement for temperature independence and long-term stability of the zero point of the differential pressure sensor. A meter tube is disposed in the container interior, extending from above the maximum liquid level to as far as the container bottom with an opening for receiving fuel within the tank. The differential pressure sensor is connected by one meter input to the upper end of the meter tube and by its other meter input is exposed to the air pressure acting upon the surface of the liquid. An air pump is connected to the upper end of the meter tube between the upper level of the fuel and the input to the pressure sensor. At the beginning of measurement, the meter tube is flooded, and an output value ($U_o$) of the differential pressure sensor is stored in memory. For determining the fill level, the meter fuel is forced from the tube by pumping air in, and the fill level ($h(t)$) is determined from a measure of the difference between the instantaneous output signal ($u(t)$) and the memorized value ($U_o$).

16 Claims, 2 Drawing Sheets

LIQUID CONTAINER HYDROSTATIC LEVEL GAUGE

PRIOR ART

The invention is based on a liquid container with a hydrostatic level gauge, in particular a fuel tank with a tank level indicator, of the type defined hereinafter.

There are many known versions of level gauges in automotive engineering for monitoring the contents of the fuel tank. As fuel tank shapes become increasingly complicated, the level gauge that uses a float is increasingly being abandoned for more flexible, nonmechanical measuring systems. For instance, electrothermal tank level indicators or tank level indicators or level gauges operating on the piezoelectric, acoustical or hydrostatic principle are already known.

In hydrostatic level gauges, the hydrostatic pressure of the liquid to be gauged is measured and from this a conclusion as to the level is drawn by including the liquid density. To be able to measure the hydrostatic pressure of the liquid in the interior of the container, the differential pressure between the liquid pressure at the bottom of the container and the air pressure above the surface of the liquid is measured; a differential pressure sensor is generally used for this. A substantial disadvantage of this differential pressure method is the temperature dependency and the long-term instability of the zero point in differential pressure sensors available on the market.

ADVANTAGES OF THE INVENTION

The liquid container according to the invention having a hydrostatic level gauge has the advantage that because of the structural design according to the invention, a zero calibration of the differential pressure sensor is readily possible and can be performed at any time. For the zero calibration, the two measurement inputs of the differential pressure sensors are exposed to the same pressure. The electrical signal output by the differential pressure sensor under these conditions is stored in memory, and in the ensuing level measurement the output signal of the differential pressure sensor is corrected upward or downward by this memorized value, depending on the algebraic sign (+or −) of this value. From the output signal, thus compensated for in terms of zero point drift, the instantaneous level inside the container is then determined by the evaluation unit, taking into account the liquid density and the acceleration due to gravity. In this way, not only is high measuring accuracy attained, but cost savings also become possible, since zero point and aging stability are no longer required of the differential pressure sensor and it can accordingly be made at much less cost. Because the zero point stability is dispensed with, more economical differential pressure sensors made by thick-film technology can now be used.

Moreover, a predetermined disposition of the differential pressure sensor on the container bottom is no longer compulsory; instead, like the air pump it may also be disposed outside the container. Only a very small tube is needed as a transmission route for the hydrostatic pressure. The pump can be kept small, keeping the technical expenditure low.

The freedom of liquid in the evacuated meter tube can be maintained in various ways. In a first embodiment of the invention, a shutoff valve is provided in line with the air pump; it opens to flood the meter tube when the pump is shut off, and it is closed, with the pump running, after evacuation of the meter tube; after that, the pump is shut off again. Flooding of the meter tube may be done by opening the shutoff valve first, prior to each measurement of the level, or only at relatively long intervals, if a zero point drift is suspected because environmental parameters (temperature) have changed.

During these long intervals, the compression of the air column in the meter tube (for example from acceleration of the liquid or from temperature fluctuations) would cause liquid to rise in the meter tube, making the outcome of measurement incorrect. This error is kept small if in a preferred embodiment of the invention the lower end of the meter tube is widened so extremely in a short axial end segment that the volume of the widened portion is substantially larger than the volume of the meter tube.

In a second embodiment of the invention, the evacuation of the meter tube is maintained by providing that the pump stays in operation continuously and maintains the pressure in the meter tube. The shutoff valve can then be dispensed with. Since the outcome of measurement would be made incorrect by the pressure drop in the meter tube, which is dependent on the pump output, the course of pressure over time in the meter tube, or in other words the continuous output signal of the differential pressure sensor over time, is monitored. Shortly after pump actuation, the output signal has an approximately constant amplitude over time; that is, the pressure in the meter tube is nearly constant. Now the pump output is reduced far enough that just at that point no liquid can rise in the meter tube. The pressure in the meter tube drops. Because the pump output is now at a minimum, the pressure drop in the meter tube leading to the incorrect result is also at a minimum. The fill level can be derived directly from the electrical signal output by the differential pressure sensor, after zero point drift correction.

The liquid container according to the invention with a hydrostatic level gauge has the same advantages as those given at the beginning of this section and moreover makes it possible to dispense with the air pump and shutoff valve. This lowers the production expense and effort still further. However, this variant of the invention is limited to liquid containers in which liquid circulation takes place via a drain and return; hence it is preferably used as a motor vehicle fuel tank having a tank level indicator, in which fuel is aspirated from the fuel tank and excess fuel returns to the fuel tank.

With interrupted liquid circulation, which is the case when the vehicle engine is off, the meter tube is filled up to the level of the instantaneous surface of the liquid in the interior of the container, by the law of communicating tubes. The same pressure acts upon the differential pressure sensor at both meter inputs. The measured value output by the differential pressure sensor is stored in memory as a correction value. When liquid is circulating, in other words when the engine is running, the column of liquid in the meter tube rises up to the overflow opening, since because of the suitably selected cross section of the outflow opening at the lower end of the meter tube, a larger volume of liquid per unit of time flows to the meter tube than out of the meter tube. The differential pressure sensor measures the differential pressure between the hydrostatic pressure at the bottom of the meter tube and that at the bottom of the container; the influence of the air pressure above the surface of the liquid is eliminated, because this air pressure has the same effect on the liquid in the meter tube and on the liquid in the container. Since the height of the overflow opening above the container bottom, the liquid density and the acceleration due to gravity are known, the instantaneous fill level can be readily ascertained from this differential pressure.

If it is desired to dispense with interrupting the circulation of liquid for the sake of zero point calibration, then in another embodiment of the invention a valve of controllable cross section should be provided at the outlet opening from the meter tube. For the zero point calibration the cross section is opened far enough that the volume of liquid flowing out via the cross section per unit of time is larger than the volume of liquid flowing to the meter tube. The height of the liquid column then matches the surface of the liquid in the container interior. If the cross section is narrowed again then, the level measurement can be performed as soon as the liquid has risen far enough in the meter tube that it emerges through the overflow opening. Once again the zero point calibration can be performed here each time the fill level is measured, or more practically, only at longer time intervals. Between these times, the continuous output signal over time of the differential pressure sensor, compensated for by the zero point drift, is a direct measure of the instantaneous fill level, so that a continuous indication that is only briefly interrupted by a zero point calibration is available.

BRIEF DESCRIPTION OF THE DRAWING

The invention is described in further detail below in terms of exemplary embodiments shown in the drawing. Shown are.

DESCRIPTION OF THE EXEMPLARY EMBODIMENTS

Figure 1:
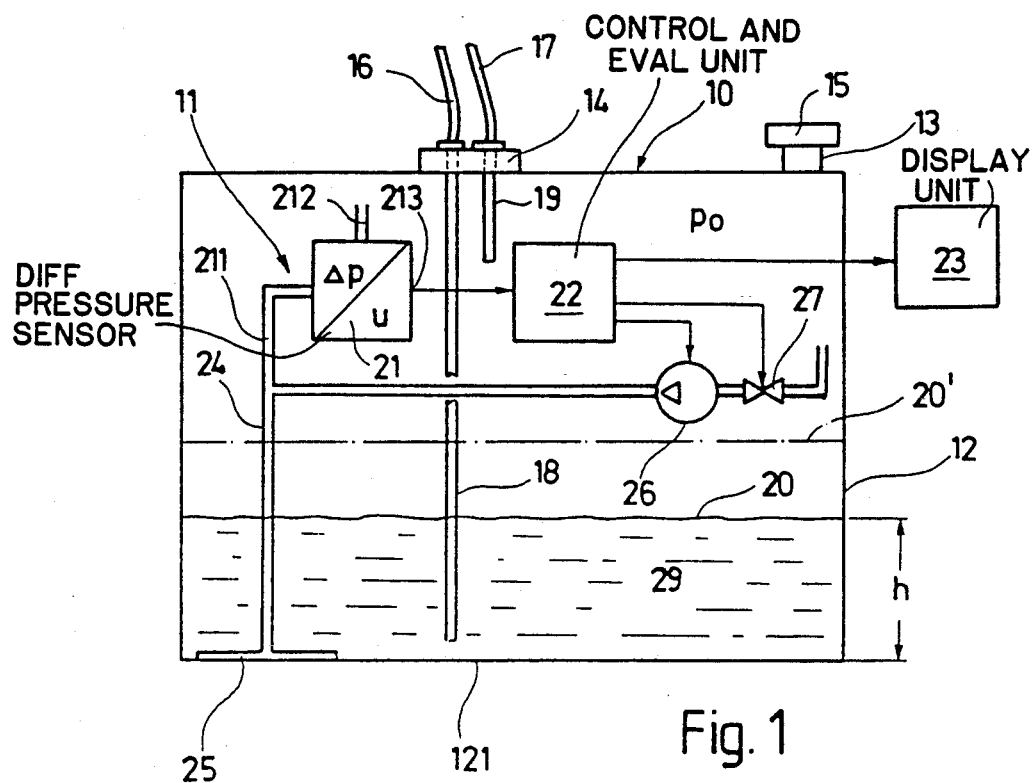
FIG. 1, a schematic diagram of a fuel tank with a hydrostatic tank level indicator.

FIG. 1, in the form of a schematic diagram, shows a fuel tank 10 with a tank level indicator 11, which serves as a general example of a liquid container with a hydrostatic level gauge. The fuel tank 10 has a housing 12 with a filler neck 13 and tank cap 14. The filler neck 13 is provided with a tank seal 15. The fuel intake line 16 to the engine and the fuel return line 17 are connected to the tank cap 14. The fuel intake line 16 discharges in an intake neck 18, which extends to below the surface 20 of the liquid, near the housing bottom 121, while the fuel return line 17 is connected to a return neck 19 discharging above the liquid surface 20.

The tank level indicator 11, operating by the hydrostatic principle, has a differential pressure sensor 21 with two meter inputs 211 and 212, the pressure input 211 is subjected to a pressure which the pressure of the fuel exerts at the bottom of the tank, and input 212 is subjected to the air pressure within the tank above the fuel level in the tank; a control and evaluation unit 22 connected to the output 213 of the differential pressure sensor 21; and a display unit 23. The tank level indicator 11 also includes a meter tube 24 of small diameter, which is vertically disposed in the housing 12 and extends from above the maximum liquid level 20', which is represented by a dot-dash line, down to the housing bottom 121. The end segment of the meter tube 24 is flared extremely, over a very short axial length and open to the fuel near the bottom of the tank, such that the volume of the flared portion 25 of the meter tube is larger than the volume of the meter tube 24. The meter input 211 of the differential pressure sensor 21 and an air pump 26 are both connected to the upper end of the meter tube 24. A shutoff valve 27 is in line with the air pump 26. The intake opening of the air pump 26, which can be opened or closed via the shutoff valve 27, like the air pump 26 itself and the shutoff valve 27, is located above the maximum liquid level 20' in the housing 12 the pipe connection to the inlet of valve 27 is within the tank above the fill line of the fuel. The meter input 212 of the differential pressure sensor 21 is also located above the maximum liquid level 20', so that the differential pressure sensor 21 is exposed on the one hand to the same air pressure that acts on the surface of the liquid, and on the other to the pressure in the meter tube 24. Both the opening and the closing of the shutoff valve 27 and the switching on and off of the air pump 26 are controlled by the control and evaluation unit 22.

The mode of operation of the tank level indicator 11 is as follows:

At the beginning of level measurement, the shutoff valve 27 is first opened by the control and evaluation unit 22, with the air pump 26 shut off. The meter tube 24 is thus flooded, causing the meter tube 24 to fill with a liquid up to the height h, which is equal to the height h of the surface of the liquid in the housing 12. The same pressure $p_0$ that prevails in the portion of the housing 12 not filled with fuel and that acts on the liquid surface 20 of the fuel 29 located in the housing 12 is also present at the meter inputs 211 and 212 of the differential pressure sensor 21. The output signal $U_O$ of the differential pressure sensor 21, which is a measure for the zero point displacement or drift of the differential pressure sensor 21, is stored in memory in the control and evaluation unit 22.

The air pump 26 is now switched on by the control and evaluation unit 22, with the shutoff valve 27 opened. The pump pumps air into the meter tube 24 and forces the fuel located in it to return to join the fuel quantity 29. After a predetermined period of time, which is dimensioned such that the meter tube 24 is reliably free of fuel, the control and evaluation unit 22 closes the shutoff valve 27 and shuts off the air pump 26. The hydrostatic pressure of the quantity of fuel 29 on the housing bottom 121 now acts upon the meter input 211 of the differential pressure sensor 21. The output signal u(t) of the differential pressure sensor 21 is continuously present at the control and evaluation unit 22. From the difference between the output signals u(t) and $U_0$ of the differential pressure sensor 21 with the evaluated and flooded meter tube 24, the control and evaluation unit 22 determines the fill level h as a function of time, in accordance with the following equation:

$$h(t) = \frac{1}{g \cdot \rho} (u(t) - U_0), \quad (1)$$

where g is the acceleration due to gravity, and $\rho$ is the liquid density of the fuel. The continuous output signal over time of the control and evaluation unit 22 is supplied to the display unit 23, at which the fill level h(t) over an arbitrary period of time can be read.

For the sake of measurement accuracy, the level measurement must be interrupted from time to time and a new zero point calibration performed; to this end, the meter tube 24 is flooded in the same way by opening the shutoff valve 27, and the output signal $U_0$ of the differential pressure sensor 21 is stored in memory with the meter tue 24 flooded. In the level measurement ensuing after evacuation of the meter tube 24, the new memorized value $U_0$ is now used for correcting the output signal u(t).

Figure 2:
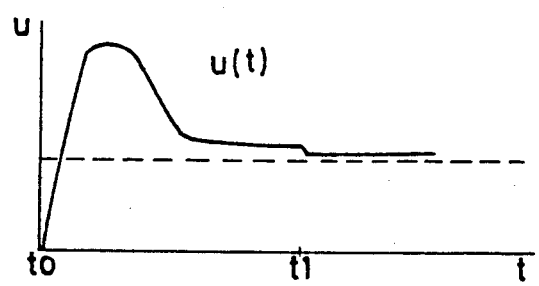
FIG. 2, a time-dependency diagram of the output signal of a differential pressure sensor, in a tank level indicator modified from FIG. 1.
Figure 3:
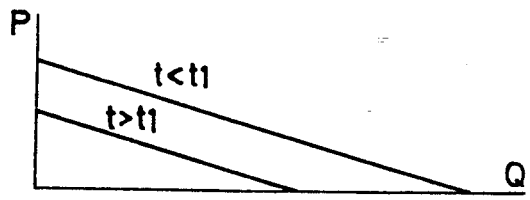
FIG. 3, a diagram of the pump characteristic in the modified tank level indicator.

In the level gauge 11 in FIG. 1, the shutoff valve 27 can be omitted, if the air pump 26 remains on for the duration of the level measurement and thus prevents fuel from entering the meter tube 24. To keep the measurement error as small as possible with the air pump 26 running, the output signal u(t) of the differential pressure sensor 21 is monitored, from the time of actuation of the air pump 26 on. The course of this output u(t) over time is shown in FIG. 2. Once the air pump 26 is switched on, with the meter tube 24 flooded, the pressure in the meter tube 24 initially rises and then attains a maximum and after a brief time drops to an approximately constant value. Once this value is attained, then the pump output of the air pump 26 is throttled by the control and evaluation unit precisely to such an extent that fuel is just barely unable to enter the meter tube 24. With the reduction in pump output, the flow of air through the meter tube 24, and thereby the pressure drop at the meter tube 24 are also reduced. As can be seen in FIGS. 2 and 3, the pump output is decreased at time t1; the pressure in the meter tube 24 and correspondingly the amplitude of the output signal u(t) of the differential pressure sensor 21 decrease accordingly. The output signal of the differential pressure sensor 21 is a virtually error-free standard for the fill level h in the fuel tank. The control and evaluation unit 22 calculates the fill level h(t) in the fuel tank 10 by equation 1, and this is displayed in the display unit 23. In FIG. 3, the pump characteristic of the air pump 26, that is, air pump pressure is shown as a function of the required air quantity. At time t=t1, the pump output is reduced, resulting in a parallel shift of the pump characteristic to lower values.

Figure 4:
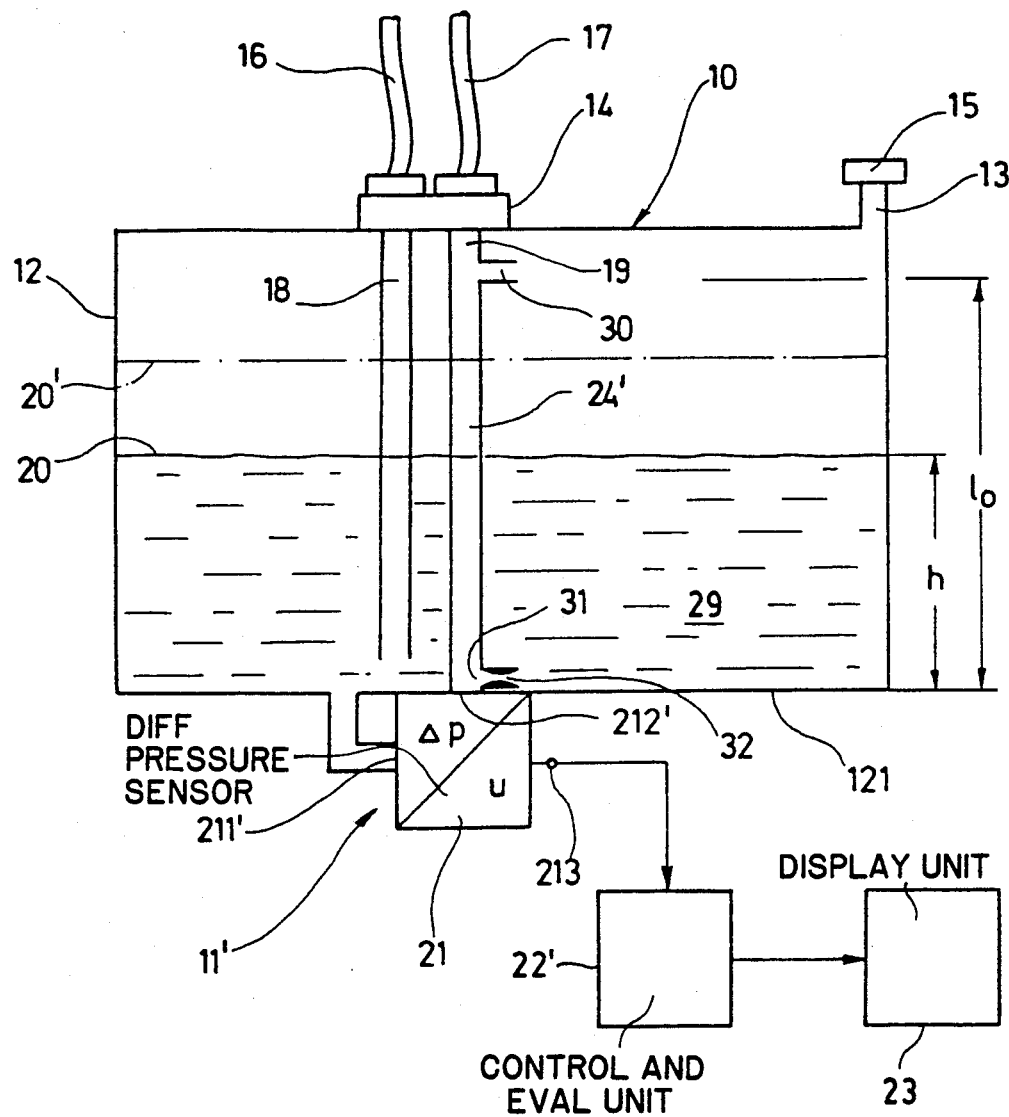
FIG. 4, a schematic diagram of a fuel tank with a hydrostatic tank level indicator in a further exemplary embodiment.

In the fuel tank 10 in FIG. 4, the level gauge or tank level indicator 11' is modified from the tank level indicator 11 described above. To the extent that components match those of FIG. 1, they have the same reference numerals. The meter tube 24', open at the face end, disposed in the housing 12 again extends from above the maximum liquid level 20' as far as the bottom 121, but it is connected by its upper end to the return neck 19. The meter tube 24 also has an overflow opening 30 at its upper end and an outflow opening 31 at its lower end, oriented toward the housing bottom 121; a throttle 32 is integrated with the outflow opening. The throttle cross section is embodied such that the quantity of liquid flowing to the meter tube 24' via the fuel return line 17 per unit of time is larger than the quantity of fluid flowing out of the meter tube 24' by the outflow opening 31 via the throttle cross section. The lower end of the meter tube 24' is connected to the meter input 212' of the differential pressure sensor 21, while the meter input 211' of the differential pressure sensor 21 is exposed to the hydrostatic pressure at the housing bottom 121. Once again, the output 213 of the differential pressure sensor 21 is connected to the control and evaluation unit 22', which in turn is connected to the display unit 23.

The mode of operation of this modified tank level indicator 11 is as follows:

When the vehicle engine is not running, no circulation of liquid takes place; that is, no fuel is aspirated from the fuel tank 10 via the fuel intake line 16 and returned to the fuel tank 10 via the fuel return line 17. By the law of communicating tubes, the meter tube 24' is filled with fuel up to the liquid level 20. The same hydrostatic pressure of the quantity of fluid 29 in the fuel tank 10 is present at both meter inputs 211' and 212'. The output signal $U_0$ of the differential pressure sensor 21 that is characteristic of the zero point deviation is stored in memory in the control and evaluation unit 22'.

When the engine is running, fuel circulation takes place, and the fuel flowing back to the housing 12 via the fuel return line 17 first flows into the meter tube 24'. Because of the cross section of the throttle 32, dimensioned as described above, the fuel level in the meter tube 24 rises until the overflow opening 30 is reached, and the fuel flows through it to join the fuel quantity 29. Accordingly the meter tube 24' is always filled with fuel up to the overflow opening 30. The overflow opening 30 is located at a fixed distance $l_0$ from the housing bottom 121. The differential pressure sensor 21 is now exposed on the one hand to the hydrostatic pressure of the liquid quantity 29 at the fill level h and on the other to the hydrostatic pressure of the fuel column of height $l_0$ in the meter tube 24', The output signal of the meter tube is thus proportional to the difference between these two hydrostatic pressures. The output signal u(t) of the differential pressure sensor 21 is supplied to the control and evaluation unit 22', which from it calculates the output signal h(t) in accordance with the following equation:

$$h(t) = l_0 - \frac{1}{g \cdot \rho}(u(t) - U_0) \quad (2)$$

Once again, g is the acceleration due to gravity, and ρ is the density of the fuel. $U_0$ is the value, stored in memory and characterizing the zero point drift, of the output signal of the differential pressure sensor 21 when the vehicle engine is off. The fill level, signal h(t) of the control and evaluation unit 22' is shown in the display unit (23) and can be read out continuously.

If it is desired to perform the zero point calibration of the pressure sensor 21 independently of the shutoff of the vehicle engine and the associated suppression of fuel circulation, then instead of the throttle 32, a variable valve may be used and connected to the outflow opening 31, a valve of variable cross section may be provided. The control of the valve is effected via the control and evaluation unit 22. For the zero point calibration of the differential pressure sensor 21, in other words for memorizing the output signal $U_0$ of the differential pressure sensor 21 while the meter tube 24' is flooded, the valve cross section is opened far enough that the quantity of liquid that is theoretically capable of flowing out of the meter tube 24' via the outflow opening 31 per unit of time is larger than the quantity of liquid flowing to the meter tube 24' via the return neck 19. With the valve cross section dimensioned in this way, the fuel level in the meter tube will adjust to the liquid level 20, so that the same hydrostatic pressure is present at both meter inputs 211', 212' of the differential pressure sensor 21. Once the output signal $U_0$ of the differential pressure sensor 21 has been stored in memory in the control and evaluation unit 21, the valve is triggered such that its flow cross section is dimensioned like the throttle 32 in FIG. 4, so that the quantity of fuel flowing into the meter tube 24' via the return neck 19 per unit of time is larger than the quantity of fuel flowing out of the meter tube 24' via the valve in the same unit of time.

We claim:

1. A liquid container hydrostatic liquid level gauge, in particular a fuel tank liquid level indicator, which has a differential pressure sensor and a control and evaluation unit that determines an instantaneous liquid level in said liquid container from electrical output signals of the differential pressure sensor and a display unit outside of said liquid container for displaying the instantaneous liquid level, said liquid level indicator is disposed in an interior of said container and includes a meter tube (24) of small diameter, open at a face end juxtaposed a bottom of said liquid container and extending from an upper end disposed above a maximum liquid level (20') in said liquid container to juxtapose the container bottom (121) and at an onset of measurement is filled with liquid up to the liquid level of the container (20), said differential pressure sensor (21) is provided with a first meter input connection (211) to which said upper end of the meter tube (24) is connected and a second meter input connection (212) which is open to an air pressure ($p_0$) which air pressure also acts upon the surface of the liquid; a zero point displacement output signal ($U_0$) is stored in memory in the control and evaluation unit (22) when the meter tube (24) is filled with liquid up to the instantaneous liquid level, then an air pump (26) is connected to an upper end portion of the meter tube (24) at a position above the maximum liquid level, said air pump pumps air into said meter tube (24) above the instantaneous liquid level which for liquid level measurement forces out the liquid about said face end to evacuate the meter tube (24), and that a liquid level determination in the control and evaluation unit (22) is effected from a difference between an output signal (u(t)) of the differential pressure sensor (21) with the meter tube (24) evacuated and said stored zero point displacement output signal.

2. A liquid container hydrostatic level gauge as defined by claim 1, in which a shutoff valve (27) is disposed in line with the air pump (26) and is opened to fill the meter tube (24) with liquid up to the instantaneous liquid level of the container and closed after liquid is forced from the meter tube (24), and that the output signal (u(t)) of the differential pressure sensor (21) associated with the air filled meter tube (24) is picked up after closure of the shutoff valve (27).

3. A liquid container hydrostatic level gauge as defined by claim 2, in which the differential pressure sensor (21) and the air pump (26), including the shutoff valve (27) are disposed in the interior of the container above the maximum liquid level (20').

4. A liquid container hydrostatic level gauge as defined by claim 2, in which the meter tube (24) has a widened portion (25) extending over a short axial length at its lower end, the diameter of which is large enough that a volume of the widened portion (25) is large compared with a volume of the length of the meter tube (24) above the widened portion.

5. A liquid container hydrostatic level gauge as defined by claim 4, in which the differential pressure sensor (21) and the air pump (26), including the shutoff valve (27) are disposed in the interior of the container above the maximum liquid level (20').

6. A liquid container hydrostatic level gauge as defined by claim 4, in which the liquid forced from the meter tube (24) is performed only once at a beginning of a relatively long period of time after a single pickup and memorizing of the output signal ($U_0$) of the differential pressure sensor (21) (zero calibration value) with the meter tube (24) filled, and the fill level (h(t)) is derived continuously from the continuous output signal (u(t)) over time of the differential pressure sensor (21), which is reduced by the zero point displacement output signal ($U_0$).

7. A liquid container hydrostatic level gauge as defined by claim 6, in which the differential pressure sensor (21) and the air pump (26), including the shutoff valve (27) are disposed in the interior of the container above the maximum liquid level (20').

8. A liquid container hydrostatic level gauge as defined by claim 1, in which the differential pressure sensor (21) and the air pump (26), including the shutoff valve (27), are disposed in the interior of the container above the maximum liquid level (20').

9. A liquid container hydrostatic level gauge as defined by claim 1, in which in a course of the output signal of the differential pressure sensor (21) during operation of the air pump over time is monitored in the control and evaluation unit (22), and upon recognition of an essentially constant amplitude with the air pump operating over time, a control signal for the air pump (26) is generated; said control and evaluation unit (22) is provided for controlling the pump output which based on the control signal reduces the pump output far enough that liquid is just barely incapable of entering the evacuated meter tube (24), and that the output signal (u(t)) of the differential pressure sensor (21) associated with the evacuated meter tube (24) is picked up after a reduction of the pump output.

10. A liquid container hydrostatic level gauge as defined by claim 9, in which the differential pressure sensor (21) and the air pump (26), including the shutoff valve (27) are disposed in the interior of the container above the maximum liquid level (20').

11. A liquid container hydrostatic level gauge as defined by claim 9, in which the evacuation of the meter tube (24) is performed only once at a beginning of a relatively long period of time after a single pickup and memorizing of the output signal ($U_0$) of the differential pressure sensor (21) (zero calibration value) with the meter tube (24) flooded, and the fill level (h(t)) is derived continuously from the continuous output signal (u(t)) over time of the differential pressure sensor (21), which is reduced by the zero calibration value ($U_0$).

12. A liquid container hydrostatic level gauge as defined by claim 11, in which the differential pressure sensor (21) and the air pump (26), including the shutoff valve (27) are disposed in the interior of the container above the maximum liquid level (20').

13. A liquid container hydrostatic liquid level gauge in which a circulation of liquid takes place via a liquid drain and a liquid return, a meter tube (24') is disposed in the container interior and is connected by its upper end to the liquid return (17, 19), said meter tube (24') opens at a face end juxtaposed a bottom of said container and extends from above a maximum liquid level (20') as far as said container bottom (121); a differential pressure sensor (21) communicates by a first meter input (212') with a lower end of the meter tube (24') and by a second meter input connection (211') is exposed to the liquid pressure at the container bottom (121); an outflow opening (31) is provided at the lower end of the meter tube (24'), with which a throttle (32) is associated, and an overflow opening (30) is provided at an upper end of the meter tube (24') above the maximum liquid level (20') if no circulation of liquid takes place at an onset of measurement said meter tube (24') is filled with liquid up to an instantaneous liquid level (20) and a zero point displacement output signal ($U_0$) is stored in memory in a control and evaluation unit (22'), if circulation of liquid takes place and a fill level determination is effected in said control and evaluation unit (22') from a difference between output signals (u(t)) of a differential pressure sensor (21) when the meter tube (24') is filled with liquid up to the overflow opening (30) and said stored zero point displacement output signal $U_0$).

14. A liquid container hydrostatic level gauge as defined by claim 13, in which said throttle (32) has a variable cross section.

15. A liquid container hydrostatic level gauge as defined by claim 13, in which the opening cross section of the throttle (32) is dimensioned such that during liquid circulation the quantity of liquid flowing to the meter tube (24') via the liquid (17, 19) per unit of time is greater than the quantity of liquid flowing out of the meter tube (24') by the outflow opening (31); and to obtain the zero point displacement output signal ($U_0$) of the differential pressure sensor (21) when the meter tube (24') is filled, the liquid circulation is temporarily suppressed.

16. A liquid container hydrostatic level gauge as defined by claim 15, in which the suppression of the liquid circulation is performed only once at the beginning of a relatively long period of time, and the zero point displacement output signal ($U_0$) of the differential pressure sensor (21) (zero calibration value) is picked up and stored in memory, and that the fill level (h(t)) is derived continuously, while liquid circulation is taking place and with an operative throttle (32) from the continuous output signal (u(t)) over time of the differential pressure sensor (21), reduced by the zero point displacement output signal ($U_0$).

* * * * *